June 6, 1944.  R. O. STEVENSON  2,350,941
COOKING APPARATUS
Filed March 11, 1942    4 Sheets-Sheet 1
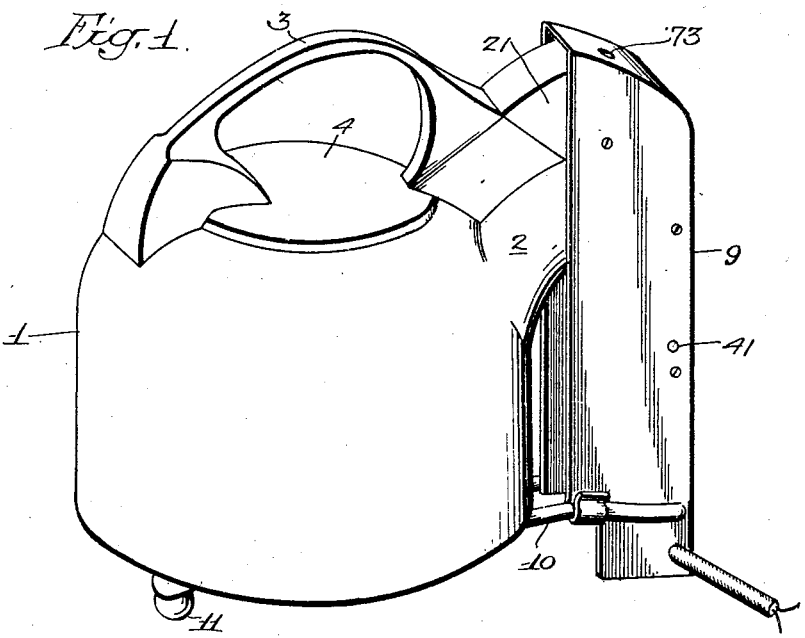
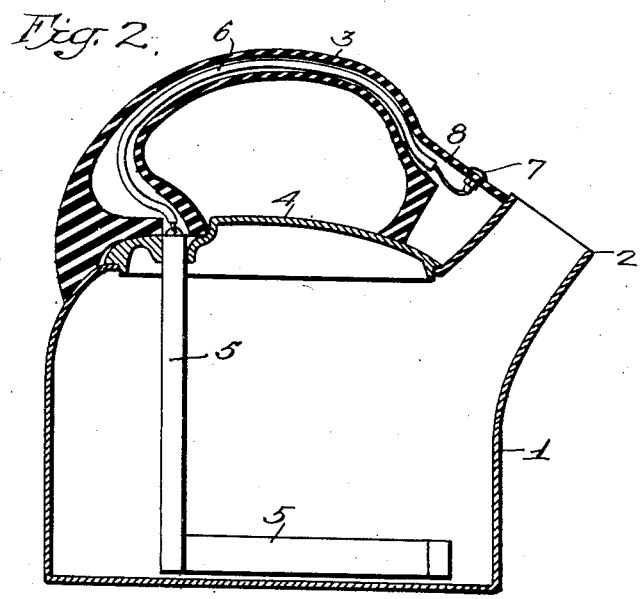
Inventor
Robert O. Stevenson
by his Attorneys
Howson & Howson June 6, 1944.　　　R. O. STEVENSON　　　2,350,941
COOKING APPARATUS
Filed March 11, 1942　　　4 Sheets-Sheet 2
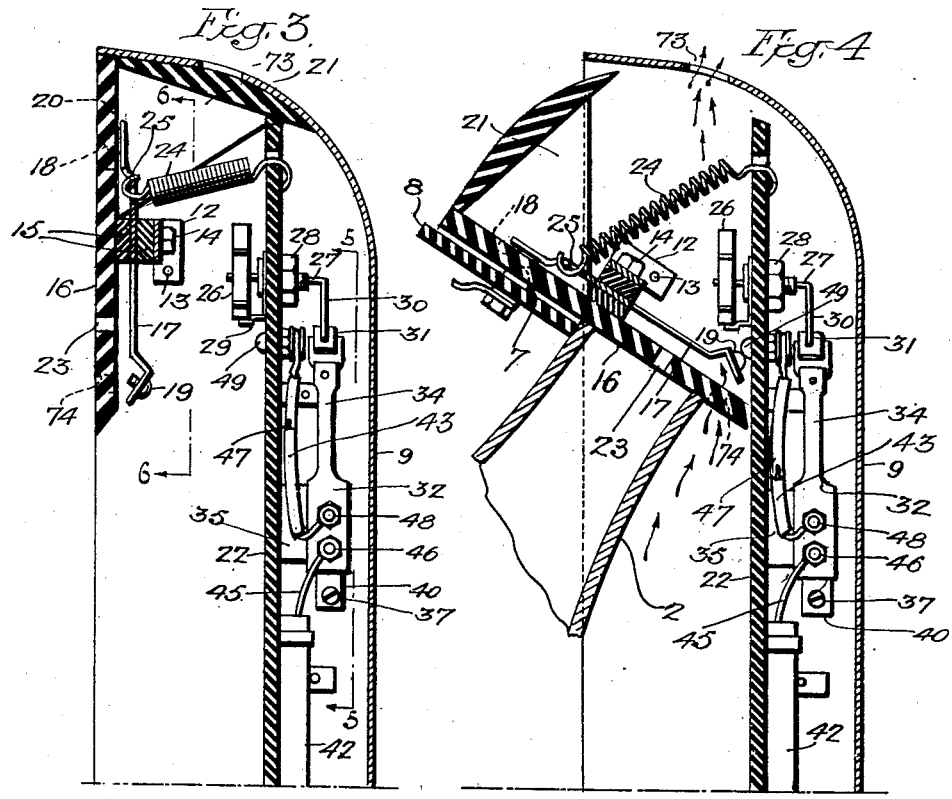
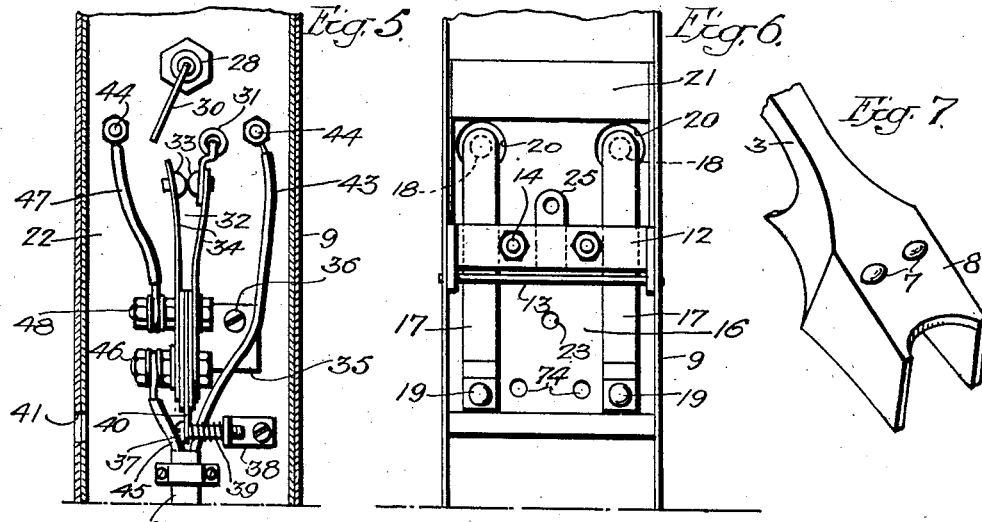
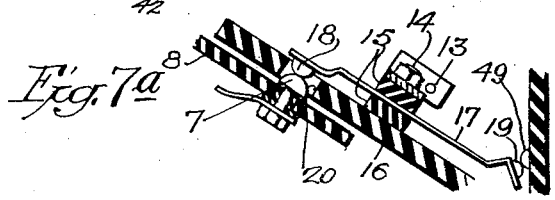
Inventor
Robert O. Stevenson
by his Attorneys
Howson & Howson

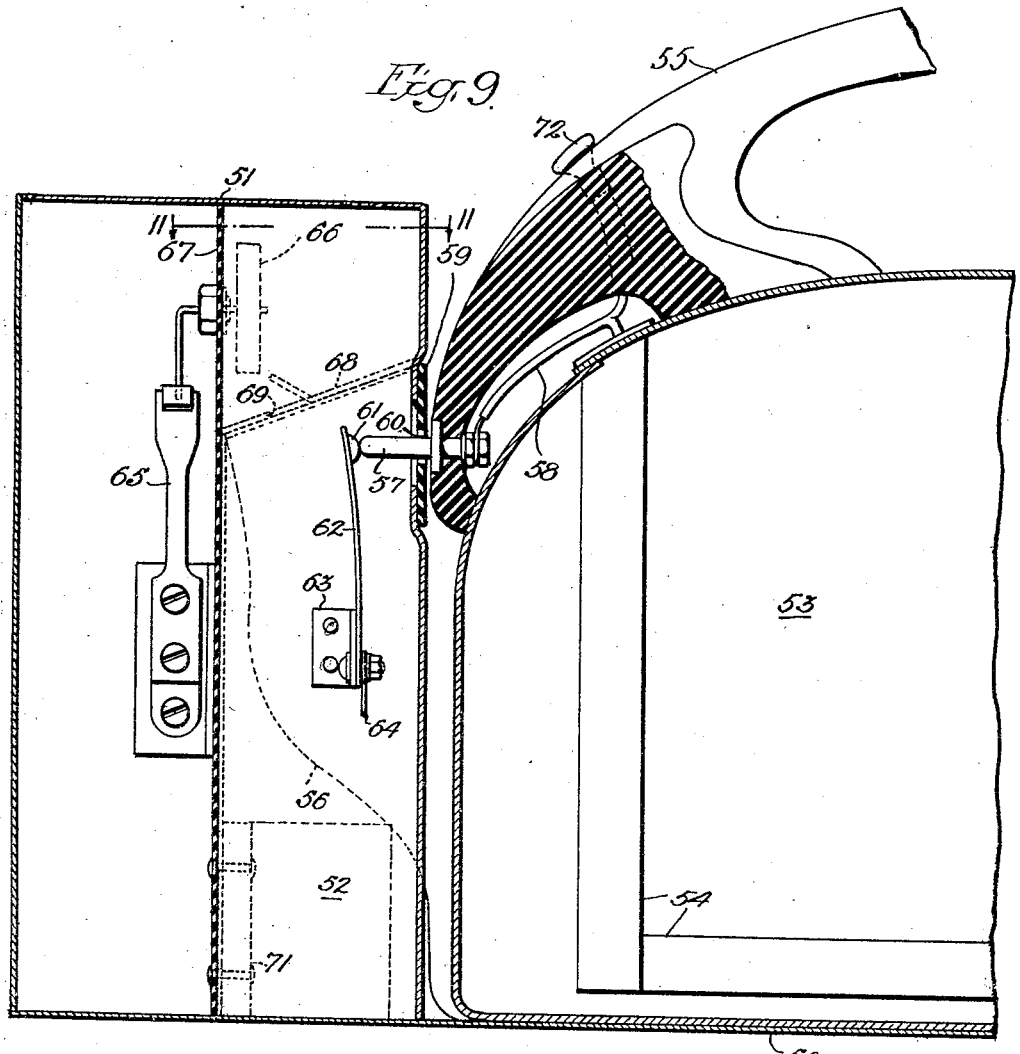
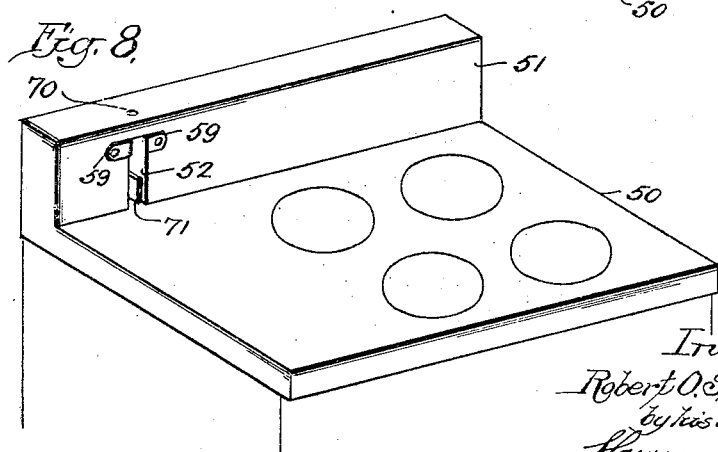

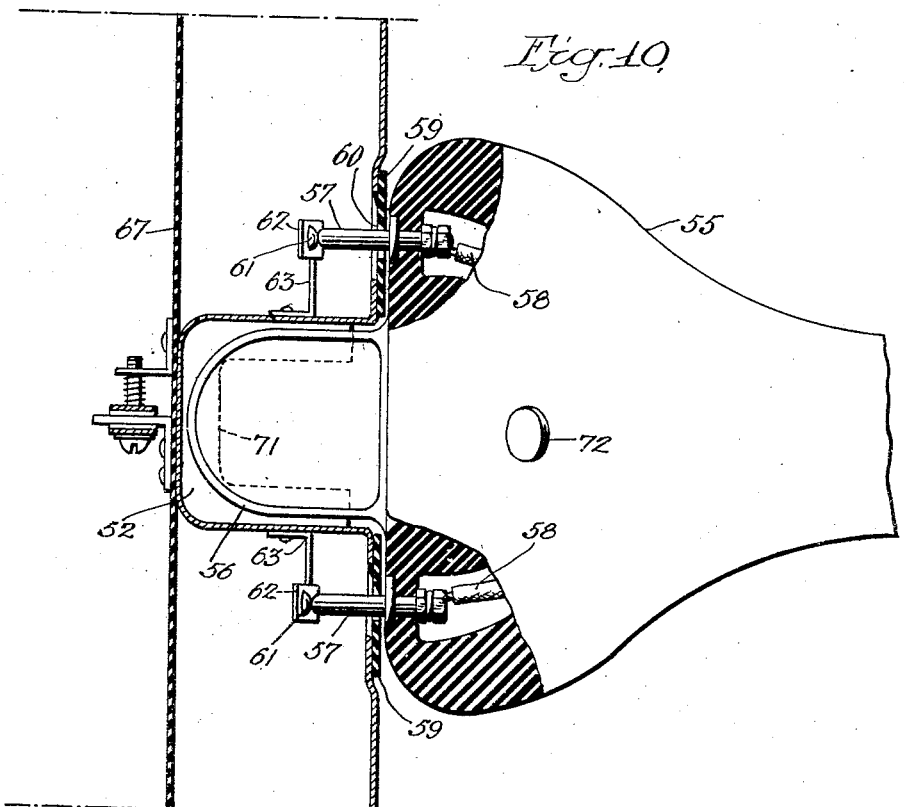
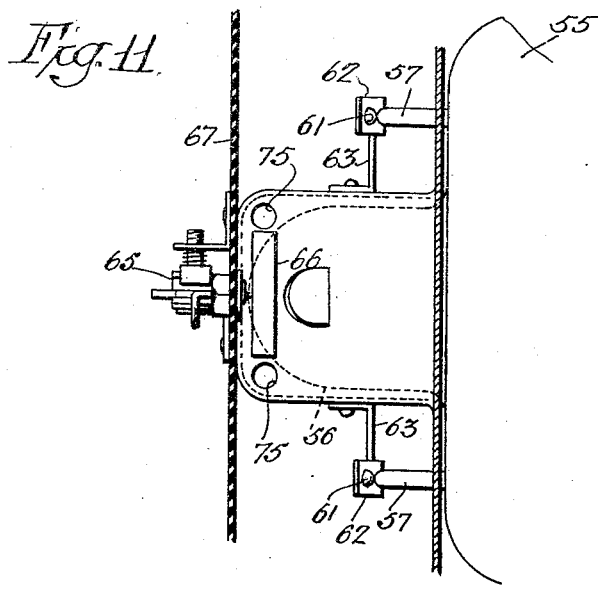

Patented June 6, 1944

2,350,941

UNITED STATES PATENT OFFICE 2,350,941

COOKING APPARATUS

Robert O. Stevenson, Philadelphia, Pa., assignor to Proctor & Schwartz, Inc., Philadelphia, Pa., a corporation of Pennsylvania Application March 11, 1942, Serial No. 434,279

17 Claims. (Cl. 219—43)

This invention relates to thermostatically controlled cooking devices and more particularly to thermostatically controlled water-heating devices.

It is frequently desirable in cooking operations to have available a supply of hot or boiling water. For example, in the making of tea, in the making of bouillon, in the making of coffee by the drip method, and in many other operations a supply of boiling water is required. It is customary, when such water is required, for the housewife or cook to place a teakettle, or other vessel, on the stove and heat it. This entails delay and furthermore is frequently attended by wasted energy caused by excessive boiling of the water after it has reached the boiling point. Frequently when water is boiled by merely heating it upon a stove, the operator deenergizes the cooking unit manually in order to prevent excessive boiling. The water may not then be used immediately, and, by the time it is used, the temperature has dropped below the desired high temperature. While electric teakettles and the like may be used, such devices, unless equipped with an automatic control, are subject to the same objections, and furthermore such devices generally are not handy to use around a kitchen because of the necessity of an electric cord attached thereto.

It is the principal object of this invention to provide a cooking device which will at all times maintain a supply of boiling hot water for cooking purposes, with a minimum waste of water and energy, and which utilizes the principles of control disclosed in my copending application Serial No. 383,636, filed March 15, 1941, now Patent Number 2,310,044, issued February 2, 1943.

A further object of the invention is to provide an automatic control for a teakettle or similar device which will maintain water at a boil with a minimum of heat loss and loss of water vapor.

Another object of the invention is to provide a cordless electric teakettle or similar device.

Still another object of the invention is to provide a control apparatus for teakettles and the like which will be safe and free from shock hazard for an operator.

A further object of the invention is to provide a control station for an automatic teakettle or the like built into an electric range, so that the teakettle may be heated separately from the regular surface cooking units. Thus, there is provided, in effect, an extra burner for heating water. This is of great value in the preparation of meals when all of the regular surface burners are generally in use. Further, if it is desired not to heat the water, the kettle may be removed, and as much surface working space is available as on a range not provided with this novel feature.

Other objects and features of the invention will be apparent hereinafter. The invention may be more readily understood by reference to the accompanying drawings, in which, Fig. 1 is a perspective view of one embodiment of the invention, the cordless electric teakettle being shown in cooperation with its control apparatus;

Fig. 2 is a sectional view through the teakettle, showing the various parts and manner of connection thereof;

Fig. 3 is a sectional view of the control apparatus in its inoperative condition;

Fig. 4 is a sectional view of the control apparatus and a portion of the teakettle in operative association therewith;

Fig. 5 is a sectional view taken along line 5—5 of Fig. 3;

Fig. 6 is a sectional view taken along line 6—6 of Fig. 3;

Fig. 7 is a fragmentary perspective view of a portion of the device;

Fig. 7A is a fragmentary sectional view taken so as to show the contact elements more clearly;

Fig. 8 is a perspective view of a range embodying the control apparatus for a different form of the device;

Fig. 9 is a sectional view of the control apparatus and teakettle in operative association;

Fig. 10 is a part plan and part sectional view of the same, the section being taken at the level of the contact pins in Fig. 9; and Fig. 11 is a fragmentary section taken along line 11—11 of Fig. 9.

With reference to Figs. 1 and 2 of the accompanying drawings, it will be seen that there is provided a teakettle 1, having a spout 2, a handle 3 and a removable cover 4. Within kettle 1 is located an electric heating element 5. Leads 6 of heating element 5 extend through hollow handle 3 to terminal contacts 7 on terminal support 8 located just above spout 2 and aligned with the spout opening.

The control apparatus which cooperates with kettle 1 has a casing 9. Attached to casing 9 is a stand 10 having feet 11. Teakettle 1 is free of attachment to the control apparatus but is adapted to be supported on stand 10, as shown in Fig. 1. Referring to Figs. 3 to 6 showing the details of the control apparatus, a bracket 12 is pivotally mounted on a transverse rod or shaft 13. Attached to bracket 12 by screws 14 or the like are insulating supporting blocks 15 and an insulating plate 16. Blocks 15 carry resilient contact arms or blades 17 having contacts 18 and 19 at their upper and lower ends. Contacts 18 are disposed in openings 20 in plate 16. (See Fig. 7A.) At the upper part of plate 16 is an extending hood 21 which is adapted to seat snugly within the upper part of casing 9 and to abut against the top of an insulating wall 22 within casing 9, as shown in Fig. 3. A hole 23 is provided in plate 16 for a purpose to be described later. One end of a spring 24 is connected to a lug 25 carried by blocks 15. The other end of spring 24 is connected to the upper part of wall 22. The spring 24 thus tends to rotate plate 16 in the clockwise direction to its inoperative position as shown in Fig. 3.

A thermal responsive element 26 in the form of a spiral strip is disposed on the front face of wall 22. The inner end of element 26 is secured to a rod 27 extending through a bearing structure 28 mounted on wall 22. The outer end of element 26 is secured to a stationary lug 29 carried by wall 22. The rotatable rod 27 extends through wall 22 and has a bent arm 30 arranged to engage an insulating roller 31 to thus actuate switch 32. The switch 32, carrying contacts 33 (see Fig. 5) comprises spring contact fingers 34 mounted on an adjustable bracket 35 pivotally secured to wall 22 by screw 36. Blades 34 are insulated from one another by suitable insulating strips and washers.

Adjustment of switch 32 is accomplished by screw 37 which is threaded into fixed bracket 38 mounted on wall 22. Spring 39 maintains extension 40 of switch 32 in engagement with the head of screw 37. A hole 41 is provided in casing 9 to permit adjustment of screw 37.

A cord or cable 42 for carrying energizing current extends into casing 9 behind wall 22. Conductor 43 from cord 42 is connected to one of two terminals 44 mounted on wall 22, while conductor 45 is connected to a terminal 46 of switch 32. A conductor 47 extends from the other terminal 48 of switch 32 to the other of the terminals 44. Terminals 44 connect to contacts 49 (Figs. 3 and 4) on the front face of wall 22.

An opening 73 is provided in the top of casing 9 above the chamber in which the thermostatic element 26 is located, and openings 74 (see Fig. 6) are provided in plate 16. The purpose of these openings will be explained presently.

The operation of the device is as follows:

When the teakettle 1 is not located on stand 10, the parts of the control apparatus assume their inoperative position as shown in Fig. 3. It will be noted that contacts 18 are deenergized, so that there is no shock hazard to an operator. When teakettle 1 is placed on stand 10 in operative position, as shown in Fig. 1, the parts of the control apparatus assume their operative position shown in Fig. 4. Plate 16 is rotated counterclockwise by spout 2 against the force of spring 24. Contacts 18 engage contacts 7 on the teakettle. Contacts 19 engage contacts 49 on wall 22. It will thus be seen that a circuit is provided from cord 42 through switch 32 and blades 17 to the heating element 5 of the teakettle. So long as switch contacts 33 remain closed, heating element 5 is energized.

When plate 16 is in operative position, hole 23 is located beneath thermomotive element 26. Steam or water vapor coming from spout 2, passes through hole 23 into the chamber in which the thermostatic element 26 is located. The steam or vapor accumulates in said chamber and actuates the thermostatic element, as disclosed in the aforementioned application. The switch 32 is so adjusted that contacts 33 will be opened by bent arm 30 of shaft 27 when the thermomotive element is heated substantially to a predetermined temperature.

It has been found that if the thermostatic switch is adjusted so that it will open when the thermostat reaches a temperature of 180° to 190° F. the water in the teakettle will be maintained just at the boiling point, and excessive boiling, particularly when the teakettle is first heated, is avoided. The openings 73 and 74 provide a small amount of ventilation in the thermostat chamber, and a current of air indicated by the arrows in Fig. 4 continually sweeps out a certain portion of the water vapors and tends to quickly cool the bimetal coil 26, unless a sufficient quantity of live steam is also coming into the chamber to counterbalance the loss. Thus the thermostat is critically sensitive to a minimum of live steam coming into the chamber.

A supply of water at the boiling point is thus constantly available in vessel 1. As the escape of steam or vapor from vessel 1 occurs only through the hole 23, and as the loss of water through vaporization occurs at a very slow rate, the kettle may be left standing for a very long period of time without boiling dry. The thermostat provides for a minimum supply of energy to the heating elements and prevents useless fast boiling.

In Figs. 8 to 11, there is shown another embodiment of the device, which in this case is incorporated in an electric range. To the top surface 50 of the range (see Fig. 8) is affixed the usual backguard 51. The control apparatus is embodied in the backguard 51 which has a recess 52 to receive the spout of the teakettle. Referring to Figs. 9 to 11, there is provided a teakettle 53 having a heating element 54 therein. At the front of the handle 55, on either side of the spout 56, there are provided contact pins 57, connected by wires 58 to heating element 54. At the control station and on opposite sides of recess 52 are two guards 59 of insulating material. Holes 60 in guards 59 are so positioned that the pins 57 may be inserted therein. Whenever pins 57 are inserted completely in holes 60, they engage contacts 61 on contact blades 62 which are resiliently mounted on brackets 63 made of insulating material. The blades 62 are connected by conductors 64 to the energy supply, the thermostatic switch 65 being serially connected in one of the energy supply leads as in the previous embodiment. As before, the switch is actuated by a thermostatic element 66 carried by insulating wall 67 and the switch elements are suitably insulated from one another.

The spout 56 of the teakettle 53 is adapted to fit into the recess 52, and the top of the spout engages an overhanging portion 68 of the backguard 51. A tab turned upwardly from portion 68 provides an opening 69 through which steam is directed into the thermostat chamber toward the thermostatic element. An opening 70 is provided in the top of the backguard 51 and openings 75 are provided in partition 68 to effect a small amount of ventilation for the purpose previously described.

At the bottom of recess 52 there is provided an asbestos pad 71, placed so as to catch and reevaporate condensate which may form from steam or vapor escaping from between the spout and partition 68 or from above partition 68 which does not form a water-tight joint with wall 67. The actual amount of water which escapes in this manner is small. In some instances it may not produce an objectionable amount of condensate, in which case the pad may be omitted, as in the embodiment of Figs. 1 to 6.

In the handle 55, there may be provided a pilot light 72, covered by a suitable translucent shield. The lamp may be connected in parallel with heating element 54 across the terminals of pins 57, or it may be connected in shunt with a series resistance. The light will thus operate whenever the heating element is energized, so that it serves to indicate that the apparatus is in proper working order. It also serves to indicate that the teakettle has been inserted sufficiently within the control station, so that the pins 57 are in contact with blades 62.

The general operation of this embodiment of the invention is similar to that of the embodiment described hereinbefore, and so it is deemed unnecessary to repeat a description of the operation. While the control station is shown as being formed integral with the backguard of the range, it is obvious that it could be made separately and could be variously attached to the backguard.

While two embodiments of the invention have been illustrated and described, it may take other forms and may be used cooperatively with equipment other than an electric range. Therefore, the invention is not to be limited by the disclosure but only by the scope of the appended claims.

I claim:

1. In combination, a cooking vessel having electric heating means thereon and an exit for heated vapors, a control apparatus free of attachment to said cooking vessel, said vessel and said control apparatus being adapted to be brought into cooperative physical relation with one another, means on said control apparatus for supplying electrical energy to said heating means, cooperative means on said vessel and said control apparatus for electrically connecting said energy-supply means to said heating means when said vessel and said apparatus are brought into said cooperative relation, and thermostatic means on said control apparatus for controlling said energy-supply means and arranged for activation by heated vapors emitted from said exit while said vessel is in said cooperative relation with the control apparatus.

2. In combination, a cooking vessel having electric heating means thereon and an exit for heated vapor, a control apparatus free of attachment to said cooking vessel, said vessel and said control apparatus being adapted to be brought into cooperative physical relation with one another, means on said control apparatus for supplying electrical energy to said heating means, cooperative means on said vessel and said control apparatus for electrically connecting said energy-supply means to said heating means when said vessel and said apparatus are brought into said cooperative relation, and thermostatic means on said control apparatus for controlling said energy-supply means and arranged to receive the heated vapor from said exit when the cooking vessel is in said cooperative relation with the control apparatus, whereby said thermostatic means responds to the temperature within said vessel.

3. In combination, a cooking vessel having electric heating means thereon and an exit for heated vapor, a control apparatus free of attachment to said cooking vessel, said vessel and said control apparatus being adapted to be brought into cooperative physical relation with one another, means on said control apparatus for supplying electrical energy to said heating means, contacts on said vessel connected to said heating means, contacts on said control apparatus arranged to be energized by said energy-supply means only when said vessel and said control apparatus are brought into said cooperative relation, and adapted to engage said first-mentioned contacts at that time to electrically connect said energy-supply means to said heating means, and thermostatic means on said control apparatus for controlling said energy-supply means and arranged to receive the heated vapor from said exit when the cooking vessel is in said cooperative relation with the control apparatus, whereby said thermostatic means responds to the temperature within said vessel.

4. In combination, a cooking vessel having a spout and electric heating means thereon, a control apparatus free of attachment to said cooking vessel and having a recess to receive said spout when said vessel is brought into juxtaposed relation to the control apparatus, means on said control apparatus for supplying electrical energy to said heating means, contacts on said vessel and said control apparatus arranged for mutual engagement when said spout is inserted in said recess, thereby to connect said energy-supply means to said heating means, and thermostatic means on said control apparatus for controlling said energy-supply means and arranged for activation by heated vapors emitted from said spout while the latter is disposed in said recess.

5. In combination, a cooking vessel having a spout and electric heating means thereon, a control apparatus free of attachment to said cooking vessel and having a recess to receive said spout when said vessel is brought into juxtaposed relation to the control apparatus, means on said control apparatus for supplying electrical energy to said heating means, contacts on said vessel connected to said heating means, a movable contact-carrying member on said control apparatus arranged to be actuated by said spout from an inoperative position to an operative position, and adapted when actuated to connect said energy-supply means to said heating means, and thermostatic means on said control apparatus for controlling said energy-supply means and arranged for activation by heated vapors emitted from said spout while the latter is disposed in said recess.

6. In combination, a cooking vessel having a spout and electric heating means thereon, a control apparatus free of attachment to said cooking vessel and having a recess to receive said spout when said vessel is brought into juxtaposed relation to the control apparatus, means on said control apparatus for supplying electrical energy to said heating means, contacts on said vessel connected to said heating means, a movable contact-carrying member on said control apparatus arranged to be actuated by said spout from an inoperative position to an operative position, and adapted when actuated to connect said energy-supply means to said heating means, said member when in operative position being disposed over the end of said spout, said member having an opening therein to permit passage of heated vapors from said vessel, and thermostatic means on said control apparatus for controlling said energy-supply means and arranged for activation by heated vapors emitted from said opening.

7. Apparatus for energizing and controlling a cordless electric cooking vessel having electric heating means and contact terminals, comprising means for supplying electrical energy, contacts engageable by the contact terminals on said vessel when the latter is brought into cooperative physical relation with the apparatus, thereby to connect said energy-supply means to the heating means on the vessel, and thermostatic means on said control apparatus for controlling said energy-supply means and arranged for activation by heated vapors emitted from said vessel while it is in said cooperative relation with the apparatus.

8. Apparatus for energizing and controlling a cordless electric cooking vessel having a spout and electric heating means with contact terminals, comprising a receptacle to receive said spout, means for supplying electrical energy, contacts engageable by the contact terminals on said vessel when the spout of the vessel is inserted in said receptacle, thereby to connect said energy-supply means to the heating means on the vessel, and thermostatic means for controlling said energy-supply means and arranged for activation by heated vapors emitted from said spout while the latter is disposed in said receptacle.

9. In an electric range, an energizing and control station for a cooking vessel having electric heating means and contact terminals, said station comprising means for supplying electrical energy, contacts engageable by the contact terminals on said vessel when the latter is disposed at said station, thereby to connect said energy-supply means to the heating means on the vessel, and thermostatic means at said station for controlling said energy-supply means and arranged for activation by heated vapors emitted from said vessel while it is disposed at said station.

10. In an electric range, an energizing and control station for a cooking vessel having a spout and electric heating means with contact terminals, said station comprising a receptacle to receive said spout when the cooking vessel is disposed at said station, means for supplying electrical energy, contacts engageable by the contact terminals on said vessel when the latter is disposed at said station, thereby to connect said energy-supply means to the heating means on the vessel, and thermostatic means for controlling said energy-supply means and arranged for activation by heated vapors emitted from said spout while the vessel is disposed at said station.

11. In an electric liquid-heating apparatus, a vessel, a pouring spout on said vessel, means for heating said vessel, and means responsive to heated vapors escaping from said spout for controlling said heating means.

12. Apparatus for energizing and controlling a cordless electric cooking vessel having electric heating means and contact terminals, comprising means for supplying electrical energy, contacts engageable by the contact terminals on said vessel when the latter is brought into cooperative physical relation with the apparatus, thereby to connect said energy-supply means to the heating means on the vessel, a chamber on said control apparatus for receiving heated vapors emitted from said vessel while it is in said cooperative relation with the apparatus, and thermostatic means in said chamber for controlling said energy-supply means.

13. Apparatus for energizing and controlling a cordless electric cooking vessel having electric heating means and contact terminals, comprising means for supplying electrical energy, contacts engageable by the contact terminals on said vessel when the latter is brought into cooperative physical relation with the apparatus, thereby to connect said energy-supply means to the heating means on the vessel, a chamber on said control apparatus for receiving heated vapors emitted from said vessel while it is in said cooperative relation with the apparatus, thermostatic means in said chamber for controlling said energy-supply means, and means for producing a small air draft through said chamber, whereby said thermostatic means is quickly cooled upon cessation of the emitted vapors.

14. In combination, a cooking vessel having a spout and electric heating means thereon, a control apparatus free of attachment to said cooking vessel, said vessel and said control apparatus being adapted to be brought into cooperative physical relation with one another, means on said control apparatus for supplying electrical energy to said heating means, cooperative means on said vessel and said control apparatus for electrically connecting said energy-supply means to said heating means when said vessel and said apparatus are brought into said cooperative relation, and thermostatic means on said control apparatus for controlling said energy-supply means and arranged for activation by heated vapors emitted from said spout while said vessel is in said cooperative relation with the control apparatus.

15. Apparatus for energizing and controlling a cordless electric cooking vessel having electric heating means and contact terminals, comprising means for supplying electrical energy, contacts engageable by the contact terminals on said vessel when the latter is brought into cooperative physical relation with the apparatus, thereby to connect said energy-supply means to the heating means on the vessel, thermostatic means on said control apparatus for controlling said energy-supply means and arranged for activation by heated vapors emitted from said vessel while it is in said cooperative relation with the apparatus, and means for collecting and re-evaporating condensate of said vapors.

16. In an electric range, an energizing and control station for a cooking vessel having electric heating means and contact terminals, said station comprising means for supplying electrical energy, contacts engageable by the contact terminals on said vessel when the latter is disposed at said station, thereby to connect said energy-supply means to the heating means on the vessel, thermostatic means at said station for controlling said energy-supply means and arranged for activation by heated vapors emitted from said vessel while it is disposed at said station, and means for collecting and re-evaporating condensate of said vapors.

17. In an electric range having a backguard at least part of which is hollow, an energizing and control station for a cooking vessel having electric heating means and contact terminals, said station comprising contacts within said backguard engageable by the contact terminals on said vessel when the latter is disposed at said station, means for supplying electrical energy to the contacts within said backguard, and a thermostatic switch disposed within said backguard and arranged for activation by heated vapors emitted from said vessel while it is disposed at said station, said switch being included in the energizing circuit for said vessel to control the same.

ROBERT O. STEVENSON.